(12) United States Patent
Riggle (10) Patent No.: US 6,820,887 B1
(45) Date of Patent: Nov. 23, 2004

(54) DOLLY FOR TOWING TRAILERS

(76) Inventor: Robert E. Riggle, 30 N. Granada Dr., Chino Valley, AZ (US) 86323

( * ) Notice: Subject to any disclaimer, the term of this patent is extended or adjusted under 35 U.S.C. 154(b) by 0 days.

(21) Appl. No.: 10/680,908

(22) Filed: Oct. 6, 2003

Related U.S. Application Data (60) Provisional application No. 60/454,833, filed on Mar. 14, 2003.

(51) Int. Cl.[7] .............................................. B62D 61/12
(52) U.S. Cl. ................................ 280/476.1; 280/490.1; 280/405.1
(58) Field of Search ........................ 280/476.1, 405.1, 280/482, 407, 490.1

(56) References Cited

U.S. PATENT DOCUMENTS

| | | | | |
|---|---|---|---|---|
| 2,309,204 | A | * | 1/1943 | Nelson ..................... 280/476.1 |
| 2,410,241 | A | | 10/1946 | Schramm |
| 2,460,466 | A | * | 2/1949 | Nogle ..................... 280/476.1 |
| 3,105,704 | A | | 10/1963 | Schramm |
| 3,837,677 | A | * | 9/1974 | Haskins ................... 280/476.1 |
| 3,858,908 | A | | 1/1975 | Frank |
| 3,865,405 | A | | 2/1975 | Mitchell et al. |
| 3,888,515 | A | | 6/1975 | Winter |
| 4,033,601 | A | * | 7/1977 | Lindahl et al. .......... 280/490.1 |
| 4,087,008 | A | * | 5/1978 | Silva, Jr. ..................... 414/563 |
| 4,253,679 | A | * | 3/1981 | Sargent ................... 280/405.1 |
| 4,405,147 | A | * | 9/1983 | Horsman et al. ........... 280/443 |
| 4,648,617 | A | | 3/1987 | Hannappel |
| 5,284,356 | A | | 2/1994 | Heider et al. |
| 5,474,320 | A | | 12/1995 | Bojarski et al. |
| 5,860,670 | A | * | 1/1999 | Aubin ...................... 280/476.1 |
| 5,924,716 | A | | 7/1999 | Burkhart, Sr. et al. |
| 6,036,217 | A | | 3/2000 | Burkhart, Sr. et al. |
| 6,224,083 | B1 | * | 5/2001 | Tyler ........................ 280/476.1 |
| 6,273,447 | B1 | | 8/2001 | Vande Berg |
| 6,685,211 | B2 | * | 2/2004 | Iles .......................... 280/476.1 |

* cited by examiner

*Primary Examiner*—Avraham Lerner
(74) *Attorney, Agent, or Firm*—Schmeiser Olsen & Watts, LLP (57) ABSTRACT

Disclosed embodiments of a dolly for towing trailers generally include a main framework, a tongue assembly, stabilizing shocks, an axle, an axle platform, a steering assembly, and/or tire-wheel assemblies. The use of these dolly embodiments reduce the probability of chassis and body damage, enable horizontal alignment of the trailer for level towing and greater weight distribution, and provide self-steering of the dollies as the towing vehicle turns or backs up.

28 Claims, 4 Drawing Sheets

DOLLY FOR TOWING TRAILERS

CROSS REFERENCE TO RELATED APPLICATION

This application claims priority to the U.S. Provisional Patent Application to Robert E. Riggle entitled "DOLLY FOR TOWING TRAILERS," Ser. No. 60/454,833, filed Mar. 14, 2003, now pending, the disclosure of which is hereby incorporated entirely herein by reference.

BACKGROUND OF THE INVENTION

1. Technical Field

This invention generally relates to trailers, and more specifically relates to a dolly for towing trailers.

2. Background Art

With vehicles, such as motorhomes for example, it is often desirable to tow trailers, such as motorsport trailers for example. However, problems arise from towing trailers with motorhomes. For example, in some situations, such as when a motorsport trailer approaches its gross trailer weight (the weight of the trailer fully loaded in its actual towing condition), the trailer tongue weight (the downward force exerted on the ball mount by the trailer coupler) can approach a weight of up to 2000 lbs or more. Tongue weights of this magnitude dangerously overload the weight capacity of the motorhome's rear end when traveling. That is, the amplified load to the motorhome frame that occurs during the bounces and rebounds over bumps, holes, bridges, and the like during travel can damage the frame, chassis, and/or body of the motorhome.

Additional problems arise when the trailer is towed in a position that is not horizontal with respect to the road. This produces further dangerous forces that a towing vehicle is not designed to support. Furthermore, as is common in conventional trailers, the tire-wheel assemblies are in a fixed position. This creates difficulty is turning the towing vehicle with the trailer attached, and in backing up a trailer, such as backing a motor boat down a boat ramp into a lake for example Accordingly, what is needed is a dolly for towing trailers that overcomes the frame, chassis, and/or body damage to towing vehicles, the horizontal alignment of the trailer, and the steering drawbacks of conventional modes of towing a trailer.

DISCLOSURE OF THE INVENTION

The present invention provides dolly embodiments for towing trailers that overcome the aforementioned drawbacks associated with towing trailers without changing or modifying a trailer and/or trailer tongue. Dolly embodiments of the invention are separate, independent towing systems used between trailers and towing vehicles. As such, they carry the weight of trailers, thereby relieving the stress on the towing vehicle. Moreover, dolly embodiments of the invention have self-steering ability. Generally, a dolly embodiment of the invention for towing trailers may comprise a main framework, a tongue assembly, stabilizing shocks, an axle, an axle platform, a steering assembly, and/or tire-wheel assemblies.

The main framework may be rectilinear in shape and may be comprised of two side members (e.g. rectilinear tubes) with aligning holes through the front ends thereof for pivotally coupling with the tongue assembly. The side members may be coupled together by a front lateral member (e.g. rectilinear tube), a steering bracket, and a rear end plate. The steering bracket may include a steering hub surrounded by a 5 bolt, 4½" bolt circle, and may be used to retain a spare tire-wheel assembly atop the main framework. Additionally, the main framework may also comprise a ball mount adjusting member used in conjunction with an adjustable ball mount assembly.

The hinged tongue assembly may comprise a lateral member (e.g. rectilinear tube) with a pair of framework mounting brackets at each end thereof. The pairs of mounting brackets may have aligning holes there through and, along with the lateral holes in the front ends of the side members, may be configured to receive a fastener to pivotally couple the tongue assembly to the main framework. An adjusting bracket configured to provide hitch shank height a adjustment for level towing may be coupled the front central portion of the lateral arm and may have a plurality of aligning holes there through for adjustably coupling with a hitch shank assembly. The adjustable hitch shank may be L-shaped, with one portion configured to slidably, removably insert into the hitch receiver of a towing vehicle. The other portion of the hitch shank may have a pair of aligning holes there through and, along with the aligning holes in the adjusting bracket, may be configured to receive a fastener to adjustably couple the hitch shank assembly to the adjusting bracket.

A pair of stabilizing shocks may be located underneath the main framework with their front ends coupled adjacent one another to the tongue assembly and their rear ends splayed apart and coupled to opposing brackets of the axel platform.

The axle may be a torsion axel that uses the flexibility of steel torsion bars or tubes, twisting lengthwise to provide spring action. Instead of the flexing action of a leaf spring, or the compressing-and-extending action of a coil spring, the torsion bars twist to exert resistance against up-and-down movement. Accordingly, the torsion axle may comprise two control arms of spring steel. One end of each torsion bar may be fixed solidly to one end of a spindle; the other end may be coupled to inner end of one of the lower cross arms and may pivot through a bushing. As the lower control arms rise and fall with wheel movement, the torsion bars twist and absorb more of the road shocks before they can reach the main framework of the dolly. The torsion bars untwist when the pressure is released, just like a spring rebounding after being compressed.

The axle platform may comprise a platform (e.g. rectilinear tube) and a pair of opposing brackets. The pair of opposing brackets may be coupled to rear end 1 portions of the stabilizing shocks, and the torsion axle may be fixed to a bottom side of the axle platform.

A steering assembly may comprise a spindle and a steering hub. The steering hub may be coupled to the steering bracket of the ma in framework and may be configured to retain a spare tire-wheel assembly top the main framework. The spindle may be rotatably coupled to the steering hub and may be fixedly coupled to a center portion of a top side of the axle platform. As a towing vehicle turns, the steering assembly allows the torsion axle to rotate and provide self-steering capabilities to enable greater control over the trailer being towed.

Each tire-wheel assembly may be coupled to one of the spindles fixed to one of the control arms of the torsion axle. This may be accomplished by the use of a hub coupled to the spindle, the hub also being configured to retain a tire-wheel assembly in a functional position. Bearing Buddies®, which keep water and dirt out of hubs and bearings may be located on outer ends of the hubs. The tires may also be high-speed tires with a 580×8 tire size.

The foregoing and other features and advantages of the invention will be apparent to those of ordinary skill in the art from the following more particular description of the invention and the accompanying drawings.

BRIEF DESCRIPTION OF THE DRAWINGS

The invention will hereinafter be described in conjunction with the appended drawings, where like designations denote like elements.

DESCRIPTION OF THE INVENTION

Dolly embodiments of the invention may generally comprise a main framework, a tongue assembly, stabilizing shocks, an axle, an axle platform, a steering assembly, and tire-wheel assemblies. Accordingly, although the invention may be readily adapted to a variety of embodiments of a dolly for towing trailers, with reference to FIGS. 1–7 doily 10 is an example of a dolly of the invention. Dolly generally comprises main framework 20, tongue assembly 40, stabilizing shocks 62, platform 64, a steering assembly comprising steering hub 65 and steering spindle 68, torsion axle 70, tire-wheel assemblies 80, adjustable ball mount assembly 90, and adjustable hitch shank assembly 100.

Main framework 20 comprises side members 22 with hinged tongue alignment holes 36 through front end portions of side members 22. Front lateral member 24 is coupled between front end portions of side members 22 and steering bracket 26 is coupled between rear end portions of side members 22. Steering hub 32 is coupled to the underside of steering bracket 26, partially extending there through. Steering hub 32 provides steering ability, as well as the ability to mount a spare tire-wheel assembly atop main framework 20 by use of securing bolts. Additionally, rear end plate 28 is coupled to rear end portions of side members 22. Rear end plate 28 is configured to couple to ball mount adjusting member 34 that contains ball mount adjusting holes 38 there through. For the exemplary purposes of this disclosure, each component of main framework 20 is substantially rectilinear in shape with the exception of steering hub 32 and dust cover 30. It will be understood by those of ordinary skill in the art that any hub and dust cover may be used as steering hub 32 and dust cover 30.

Tongue assembly 40 comprises lateral member 42 coupled between framework mounting brackets 47. Frame work mounting brackets 47 each comprise a pair of bracket plates 46 with main framework aligning holes 48 there through and bracket spacer 44 coupled there between. Adjusting brackets 50 with hitch shank adjusting holes 52 there through are coupled to a front side of lateral member 42 and L-bracket 54 with shock mounting holes 56 there through is coupled to a bottom side of lateral member 42. For the exemplary purposes of this disclosure each component of hinged tongue assembly 40 is substantially rectilinear in shape.

Front end portions of stabilizing shocks 62 are mounted to L-bracket 54 and rear end portions of stabilizing shocks 62 are mounted between flanges 66 of platform 64. A bottom portion of steering spindle 68 is fixedly and centrally coupled to a top side of platform 64. Steering spindle 68 has a top portion configured to rotatably mount steering hub 32 to provide steering as will be discussed in greater detail hereinafter. For the exemplary purposes of this disclosure, stabilizing shocks 62 and steering spindle 68 are cylindrical in shape and platform 64 and flanges 66 are rectilinear in shape.

Torsion axle 70 is fixedly coupled to a bottom side of platform 64. Torsion axle 70 comprises cross arm 76 coupled between control arms 72. Each control arm 72 is coupled to a spindle 74 and hub 78 is coupled to each spindle 74. Each hub 78 is coupled to a tire-wheel assembly 80. Each hub 78 has a corresponding dust cover coupled to it to protect the bearings within hub 78. For exemplary purposes of this disclosure, cross arm 76 and control arms 72 are each substantially rectilinear in shape and spindle 74 is substantially curvilinear in shape (e.g. cylindrical). It will be understood by those of ordinary skill in the art that hubs 78, tire-wheel assemblies 80 and dust covers 30 may be of the type typically used on trailers.

Particularly useful to the present invention any of the axels provided by and through Reliable Tool & Machine Co., Inc. of Kendallville, Ind., such as the torsion axle identified by Torsion Axle Part Number RT-2000-191. Accordingly, for the exemplary purposes of this disclosure, torsion axle 70 may be the torsion axle identified by Torsion Axle Part Number RT-2000-191 and have the following characteristics:

| | |
|---|---|
| Capacity | 10 |
| Spindle Type | BT |
| Hub Face | 32 |
| Outside Bracket | 20 |
| Bracket Type | Special |
| Starting Angle | 45 |
| Axle Type | Idler |
| Hub Or HD # | 1-150-04-00 |
| Bolt Patter | 545 |
| Mounting Style | Studded |

Figure 1:
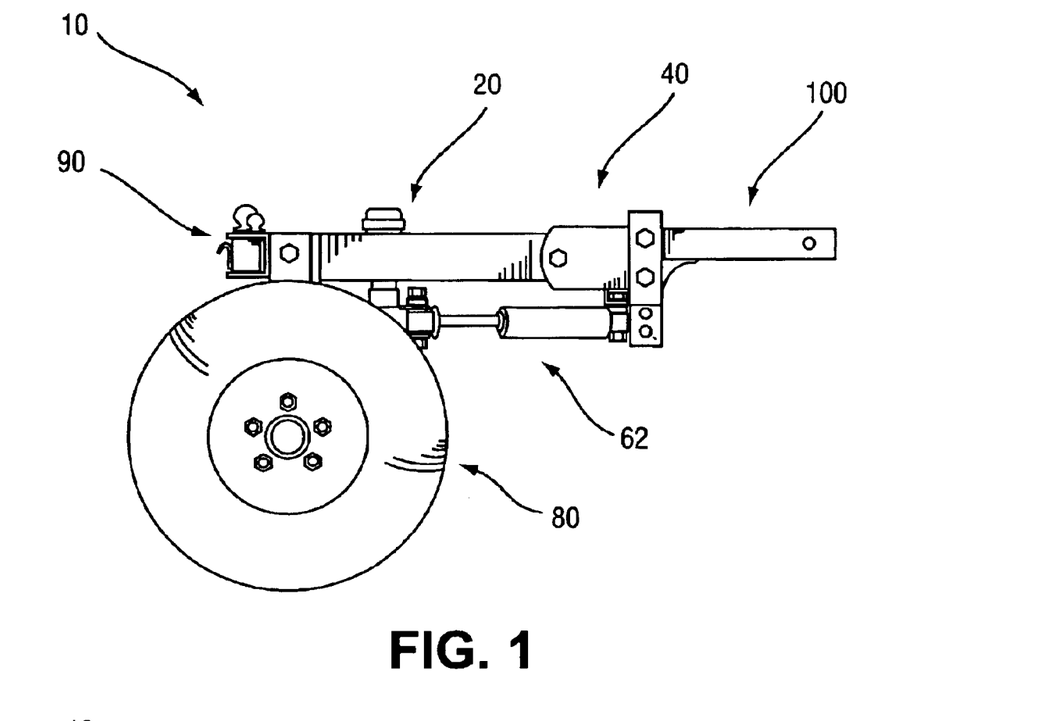
FIG. 1 is a side view of a dolly configured according to an embodiment of the present invention.
Figure 2:
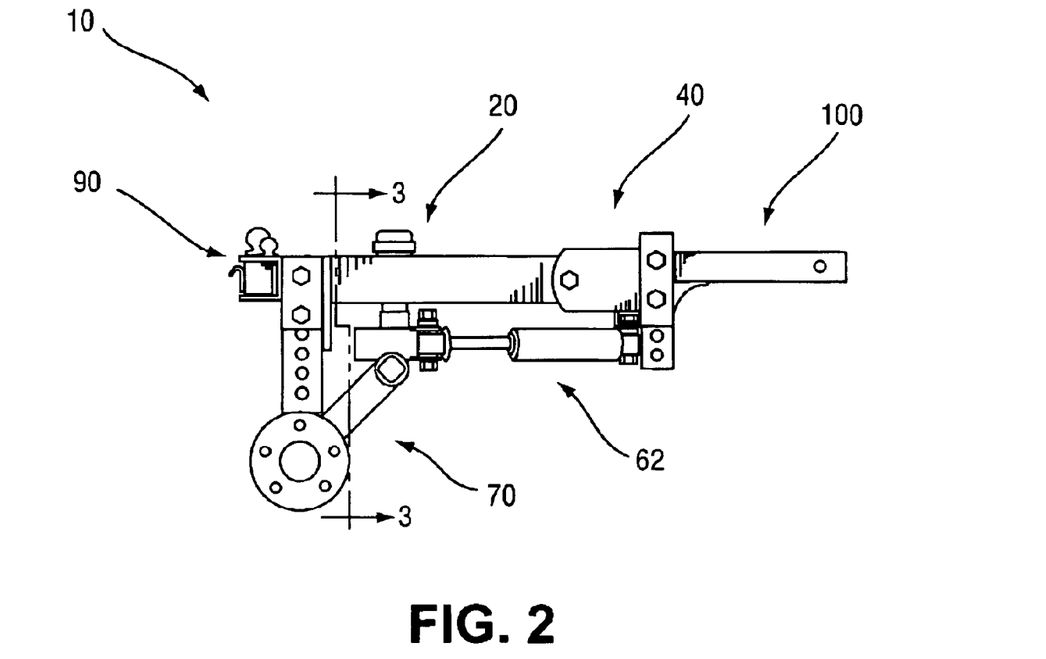
FIG. 2 is a side view of the dolly of FIG. 1 without tire-wheel assemblies.
Figure 3:
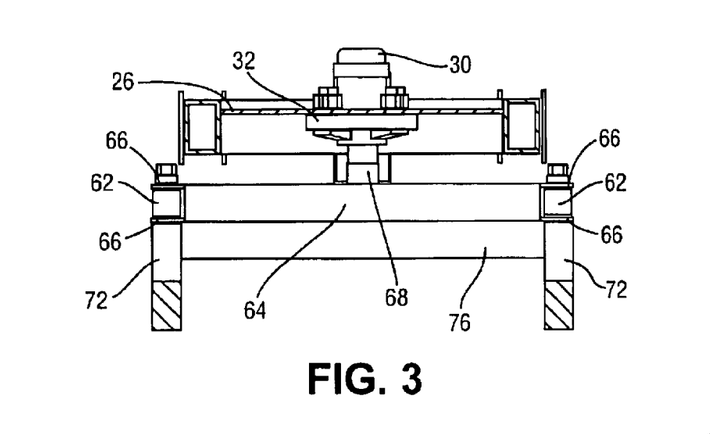
FIG. 3 is a section view of the dolly of FIG. 1 taken along line 3—3 of FIG. 2.
Figure 7:
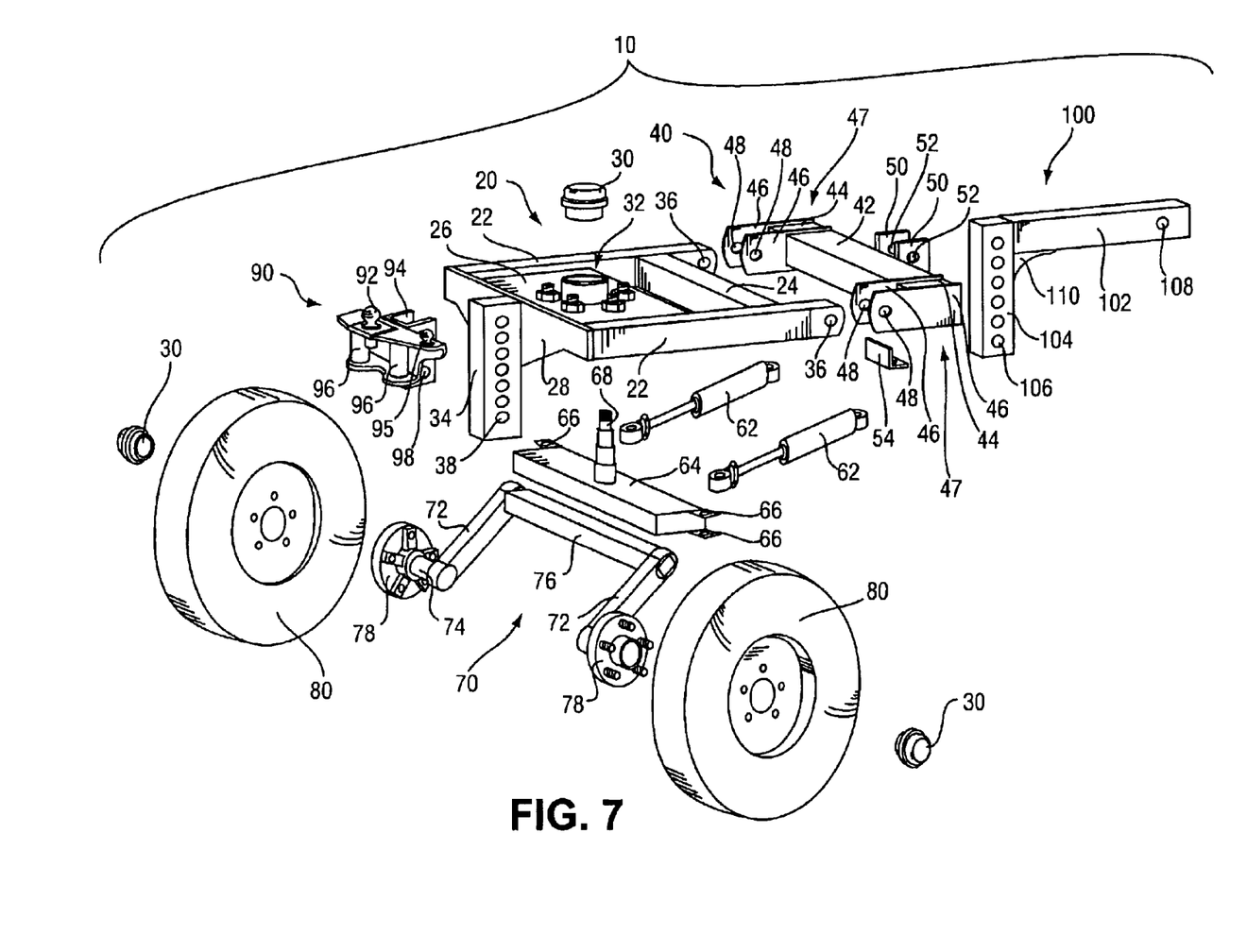
FIG. 7 is an exploded view of the dolly of FIG. 1.

Adjustable ball mount assembly 90 comprises ball mount 92, ball mount adjusting brackets 94 with adjusting holes 98 there through, sway control coupler 95, and a pair of spring bar couplers 96. Adjustable hitch shank assembly 100 comprises hitch shank 102 with hitch receiver hole 108 there through, as well as adjusting member 104 with adjusting holes 106 there through. Hitch shank 102 and adjusting member 104 are coupled in an L-formation with hitch shank support 110 providing the necessary support. For the exemplary purposes of this disclosure, adjustable ball mount assembly 90 and adjustable hitch shank assembly 100 are those typically used in conjunction with towing.

It will be understood by those of ordinary skill in the art that the invention is not limited to dolly 10 and its components disclosed herein, as virtually any dolly and components known in the art consistent with the intended operation of a dolly for towing trailers may be utilized. Accordingly, for example, although particular dollies, frameworks, tongue assemblies, platforms, stabilizing shocks, steering spindles, steering hubs, torsion axles, tire-wheel assemblies, adjustable ball mount assemblies, adjustable hitch shank assemblies, and other components are disclosed, such components may comprise any shape, size, style, type, model, version, class, measurement, material, weight capacity, and/or the like as is known in the art for such components consistent with the in tended operation of a dolly of the invention for towing trailers. It will also be understood by those of ordinary skill in the art that the invention is not limited to use of any specific components, provided that the components selected are consistent with the intended operation of a dolly of the invention for towing trailers.

Accordingly, for the exemplary purposes of this disclosure, each side member 22 may be a tube having dimensions of approximately 2 inches by 3 inches by 0.25 inches with a length of approximately 16 inches. The front end portion of each side member 22 may be a plate having a radius of curvature of approximately 3 inches to 6 inches. Front lateral member 24 may be a tube having dimensions of approximately 2 inches by 3 inches by 0.25 inches with a length of approximately 16 inches. Steering bracket 26 may be a plate having dimensions of approximately 8 inches by 16 inches by 0.25 inches. Ball mount adjusting member 34 may be a block having dimensions approximately 2 inches by 2.5 inches by 10 inches. Lateral member 42 may be a tube having dimensions of approximately 3 inches by 3 inches by 0.25 inches with a length of approximately 15.25 inches. Each bracket plate 46 may have dimensions of approximately 4 inches by 5.5 inches with a radius of curvature on a rear end of approximately 3 inches. Each bracket spacer 44 may be a tube having dimensions of approximately 3 inches by 3 inches by 0.25 inches with a length of approximately 2.25 inches. Each adjusting bracket 50 may be a plate having dimensions of approximately 2 inches by 6 inches by 0.5 inches. L-bracket 54 may be an angle member having dimensions of approximately 1.5 inches by 1.5 inches by 0.25 inches with a length of approximately 3 inches. Platform 64 may be a tube having dimensions of approximately 2 inches by 5 inches by 0.25 inches with a length of approximately 20 inches. Each flange 66 may be trapezoidal plate having a thickness of approximately 0.1875 inches. One of the parallel sides is approximately 1.5 inches in length, the other parallel side being approximately 1.9375 inches. The perpendicular side opposing the side coupled to platform 64 is approximately 1.5 inches in length. Steering spindle 68 may have dimensions of approximately 1.75 inches diameter by 7.875 inches in length. Torsion axel 70 may have a hub separation of approximately 20 inches. All plate and wall thicknesses not previously disclosed may be approximately 0.5 inches and approximately 0.25 inches respectively.

The components defining any dolly embodiment of the invention may be formed of any of many different types of materials or combinations thereof that can readily be formed into shaped objects provided that the components selected are consistent with the intended mechanical operation of a dolly of the invention. For example, the components may be formed of the following types of materials and/or any combinations thereof: rubber, such as synthetic, natural, and/or other like materials; composites such as fiberglass, carbon-fiber, and/or other like materials; polymers, such as plastic, polycarbonates, tinted polycarborates, PVC plastic, ABS plastic, polystyrenes, nylon, phenolics, and/or other like materials; elastomers, such as thermoplastic elastomers and/or other like materials; metals, such as zinc, magnesium, copper, iron, steel, and/or other like materials; and/or alloys, such as aluminum and/or other like materials. Accordingly, for the exemplary purposes of this disclosure, main framework 20, tongue assembly 40, platform 64, adjustable hitch shank assembly 100, and adjustable ball mount assembly 90 may be formed of steel.

The components defining any dolly embodiment of the invention may be purchased pre-manufactured or manufactured separately and then assembled together. However, any or all of the components may be manufactured simultaneously and integrally joined with one another. Manufacture of these components separately or simultaneously may involve extrusion, pultrusion, injection molding, resin transfer molding, casting, milling, cutting, welding, soldering, riveting, punching, stamping, and/or the like. If any of the components are manufactured separately, they may then be coupled with one another in any manner known in the art, such as with adhesive, a weld, a fastener (e.g. a bolt, a screw, a rivet, a securing pin), any combination thereof, and/or the like for example, depending on, among other considerations, the particular material forming the components. Other possible steps might include sand blasting, polishing, powder coating, and/or painting the components for example.

Accordingly, for the exemplary purposes of this disclosure, dolly 10 may be assembled as depicted in FIGS. 1–3 and 7. First, main framework 20 may be pivotably coupled to tongue assembly 40 by using a fastener through corresponding hinged tongue alignment holes 36 and main framework alignment holes 48. Second, torsion axle 70 is coupled to a bottom side of platform 64. Third, steering spindle 68 is rotatably coupled to steering hub 32 which is coupled to steering bracket 26. Fourth, stabilizing shocks 62 are be mounted to L-bracket 54 and to flanges 66. Fifth, adjustable ball mount assembly 90 may be coupled to ball mount adjusting member 34 by use of a pair of fasteners through ball mount adjusting holes 38 and corresponding adjusting holes 98 on adjustable ball mount assembly 90. Sixth, adjustable hitch shank assembly 100 may be coupled to mounting brackets 50 by use of a pair of fasteners through hitch shank adjusting holes 52 and corresponding adjusting holes 106 on adjustable hitch shank assembly 100. Seventh, tire-wheel assemblies 80 are coupled to hubs 78 of torsion axle 70.

While the assembly of dolly 10 has been described in a particular sequence of steps with reference to FIGS. 1–3 and 7, it will be understood by those of ordinary skill in the art that the assembly of any dolly embodiment of the invention is not limited to the specific order of steps as disclosed. Any steps or sequence of steps of the assembly of any dolly embodiment of the invention indicated herein are given as examples of possible steps or sequence of steps and not as limitations, since various assembly steps and sequences of steps may be used to assemble any dolly embodiment of the invention.

For example, adjustable ball mount assembly 90 and adjustable hitch shank assembly 100 may be coupled to main framework 20 and tongue assembly 40 respectively at any time during the assembly process. Further as an example, tongue assembly 40 may be coupled to main framework 20 after steering spindle 68 is rotatably coupled to steering hub 32.

The present invention is particularly well-suited for use with motorhomes and motorsport trailers. However, it will be understood by those of ordinary skill in the art that the invention is not limited to uses relating to motorhomes, motorsport trailers, and the like. Rather, any description relating to motorhomes, motorsport trailers, and the like is for the exemplary purposes of this disclosure, and those of ordinary skill in the art will also understand that the invention may also be used with similar results in a variety of applications for any type of towing vehicle and any type of trailer, such as boat trailers, horse trailers, RV trailers, utility trailers, and the like.

Figure 4:
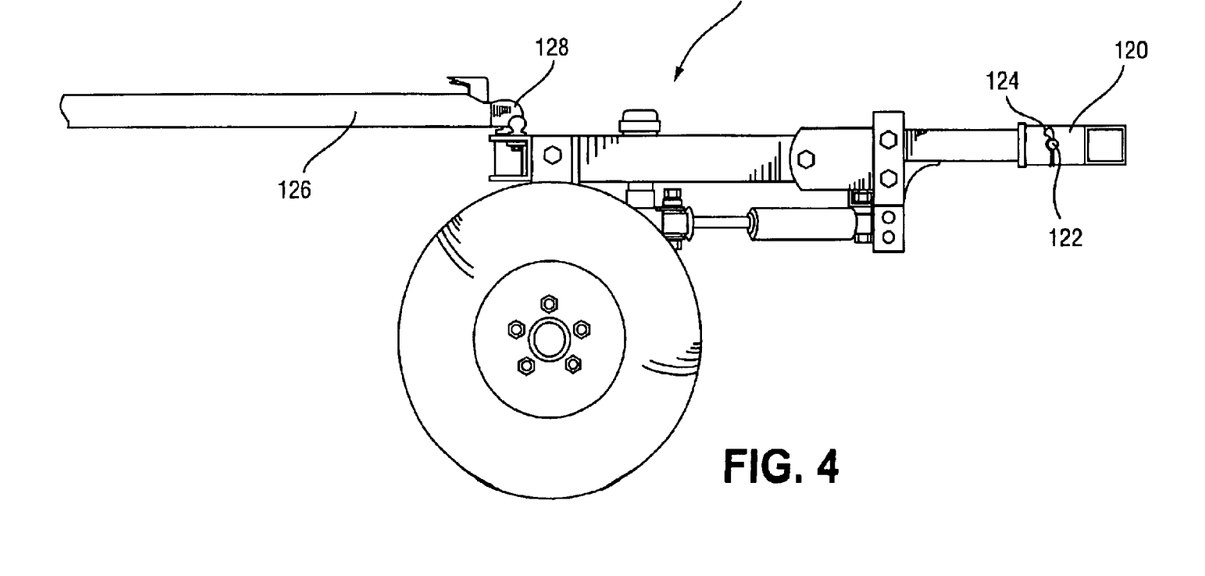
FIG. 4 is a side view of the dolly of FIG. 1 in conjunction with a hitch receiver and trailer tongue.
Figure 5:
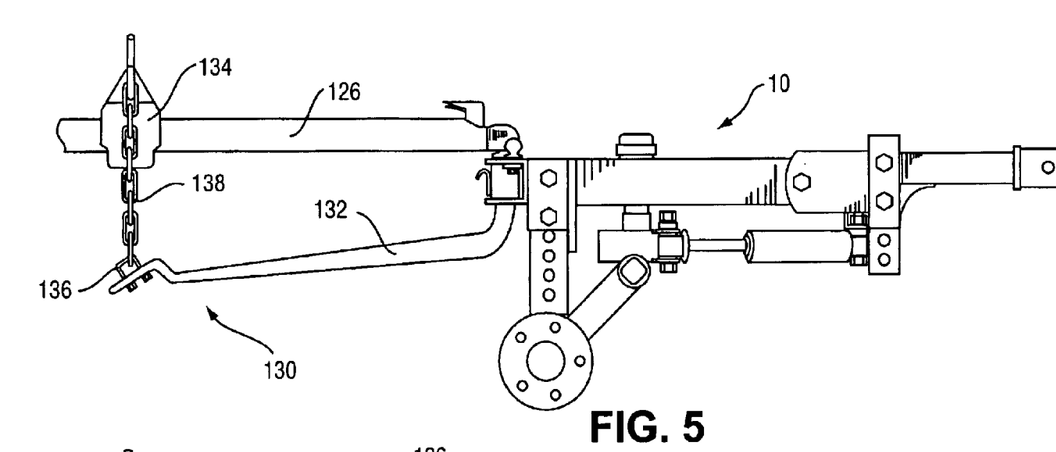
FIG. 5 is a side view of the dolly of FIG. 1 without tire-wheel assemblies in conjunction with a weight distribution assembly.
Figure 6:
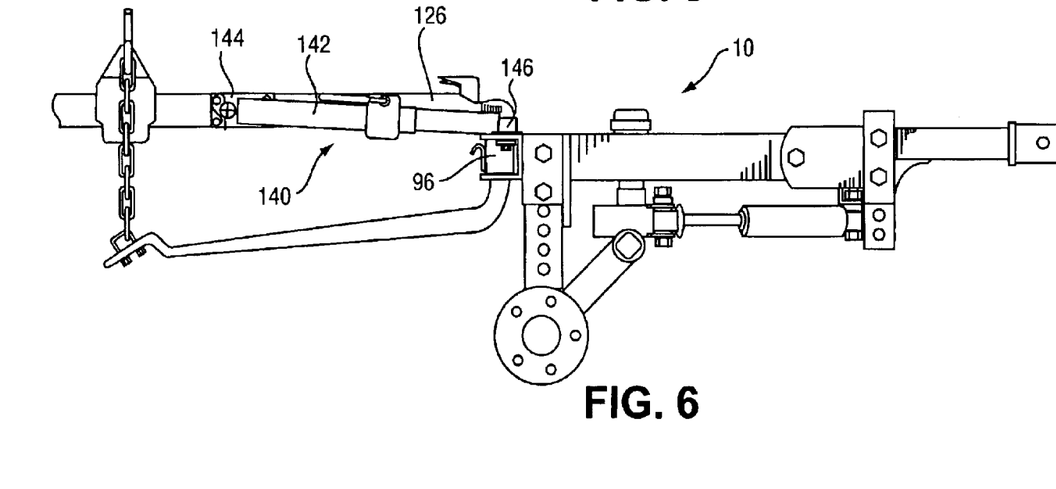
FIG. 6 is a side view of the dolly of FIG. 1 without tire-wheel assemblies in conjunction with a weight distribution assembly and a sway control assembly.

In describing the use of the present invention further, although the invention may be readily adapted to a variety of embodiments of a dolly, with reference to FIGS. 4–6 and for the exemplary purposes of this disclosure, dolly 10 is shown in use with trailer tongue 126 mounted onto the adjustable ball mount assembly 90 by use of tongue socket hitch 128. It will be understood by those of ordinary skill in the art that the attachment of socket hitch 128 onto adjustable ball mount assembly 90 is similar to typical connections of socket hitches and ball mounts. Adjustments in ball mount assembly 90 may be made to ensure trailer tongue 126 is in a substantially parallel position with respect to the road for example, or any other towing surface. Additionally, dolly 10 may be coupled to a towing vehicle by use of a hitch receiver 120, which is typically attached to the towing vehicle. Adjustable hitch shank assembly 100 is coupled to hitch receiver 120 by use of hitch pin 122 and locking pin 124. The coupling of hitch shank 100 and hitch receiver 120 will be understood by those of ordinary skill in the art to be similar to typical connections of hitch shanks and hitch receivers.

In an embodiment of a dolly of the invention as depicted in FIG. 5, spring bar assembly 130 may also be used in conjunction with dolly 10. Spring bar assembly 130 comprises spring bars 132, first trailer coupler 134, U-bolt 136 and coupling chain 138. Spring bars 132 are inserted into spring bar couplers 96 and U-bolt 134 is coupled to an opposing end. Coupling chain 138 is coupled to U-bolt 136 and first trailer coupler 134, which is mounted onto trailer tongue 126. In operation, spring bar tension may be adjusted by changing links in coupling chains 138. This allows for adjustments for various trailer tongue weights within the spring bar weight range by applying tension on spring bars 132 until dolly 10 is level. Rather than merely supporting the trailer tongue weight, spring bar assembly 130 applies leverage between dolly 10 and the trailer causing the trailer tongue weight to be carried by axle 70 of dolly 10. When the trailer tongue weight is distributed in this way, trailers with greater the trailer tongue weights can be towed resulting in a more level ride, which reduces stress on the rear of the tow vehicle and provides greater steering and brake control.

In another embodiment of a dolly of the invention as depicted in FIG. 6, sway control assembly 140 may also be used in conjunction with dolly 10 and spring bar assembly 130. Sway control assembly 140 may comprise sway controller 142, second trailer coupler 144 and ball mount coupler 146. Second trailer coupler 144 may be coupled to trailer tongue 126. Sway controller 142 may be coupled to second trailer coupler 144 and to ball mount coupler 146. Ball mount coupler 146 may be mounted onto adjustable ball mount assembly 90 by use of sway control coupler 95. The addition of sway control assembly 140 dampens sway caused by traffic and crosswinds and contributes positively to tow vehicle, dolly 10, and trailer stability. Sway control assembly 140 may be a friction sway control system or a dual cam sway control system. The friction sway control system uses friction to resist pivotal movement and thereby works against the effects of induced sway. It operates on the principle of "stiffening" the coupling between the tow vehicle and trailer. The degree of "stiffening" or friction is adjusted to suit various trailer weights and towing conditions. The dual cam sway control system can control trailer sway. When towing in a straight line, the cams on either side of trailer tongue 126 are locked in position. This essentially creates a "rigid" connection between dolly 10 and the trailer and minimizes the effects of induced sway caused by high cross-winds or passing vehicles. Usually the cams ride in a detent, locked in position, even on fairly sharp curves. However, when cornering maneuvers are required, the cams automatically slide out of their detent to permit full radius turns. Yet when the maneuver is short and abrupt, like that encountered in the event of a sudden swerve or a wheel dropping off the road, the cams seek a straight line towing angle that helps the tow vehicle retain control. The advantage of the dual cam system is its ability to forestall sway in addition to sway resistance. It works to hold down the start of saying activity while at the same time allowing free and easy vehicle and trailer interaction.

Overall and for the exemplary purposes of this disclosure, use of embodiments of a dolly of the present invention may provide various benefits and advantages over conventional dollies. Dollies of the invention reduce body and chassis damage to towing vehicles by bearing a greater portion of the load seen by the vehicle. They also allow for horizontal towing of the trailer to create a more efficient weight distribution. In extreme situations where the towing vehicle has a high lift and the trailer is particularly low, the adjustable hitch shank assembly may be adjusted to fit the height of the towing vehicle and the ball mount assembly may be adjusted to the height of the trailer tongue, again enabling for level towing. The steering assembly (steering hub and steering spindle) fosters self-steering ability for the dolly. Allowing the free rotation of the platform to which the axle is coupled enables the dolly tire-wheel assemblies to turn as the towing vehicle turns and gives greater control over the trailer, particularly when backing up the trailer. The stabilizing shocks, alone or in conjunction with the spring bar assembly and/or sway control assembly, give greater stability and greater dynamic control so that when towing over rougher terrain, the possibility of body and chassis damage is greatly reduced if not eliminated.

The embodiments and examples set forth herein were presented in order to best explain the present invention and its practical applications and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. Accordingly, any components of the present invention indicated in the drawings or herein are given as an example of possible components and not as a limitation. Similarly, any steps or sequence of steps of methods indicated herein are given as examples of possible steps or sequence of steps and not as limitations.

What is claimed is:

1. A dolly for towing trailers comprising:
    a main framework comprising:
        a steering bracket;
        a rear end plate; and
        a pair of side members each having a front end portion and a rear end portion, wherein the steering bracket is coupled between the rear end portions, and wherein the rear end plate is coupled to the rear end portions;

a platform underneath the main framework comprising a top side and a bottom side;

a steering assembly between the main framework and the platform comprising:

a steering hub coupled to the steering bracket configured to retain a spare tire-wheel assembly atop the main framework; and a steering spindle having a first end portion rotatably coupled to the steering hub and a second end portion coupled to the top side of the platform; and a tongue assembly pivotably coupled to the front end portions of the side members of the main framework.

2. The dolly of claim 1 further comprising a ball mount adjusting member having a plurality of ball mount adjusting holes, the ball mount adjusting member coupled to the rear end plate.

3. The dolly of claim 2 further comprising an adjustable ball mount assembly having two pairs of adjusting holes corresponding to two ball mount adjusting holes of the ball mount adjusting member, the two adjusting holes and the two pair of adjusting holes configured to receive a fastener there through when aligned to removably couple the adjustable ball mount assembly and the ball mount adjusting member.

4. The dolly of claim 1, the tongue assembly further comprising a pair of framework mounting brackets coupled to the front end portions of the side members.

5. The dolly of claim 1 further comprising a pair of stabilizing shocks each comprising a front end portion and a rear end portion, each front end portion coupled to the tongue assembly and each rear end portion coupled to the platform.

6. The dolly of claim 1 further comprising an adjusting bracket having two pairs of hitch shank adjusting holes, the adjusting bracket coupled to the tongue assembly.

7. The dolly of claim 6 further comprising an adjustable hitch shank assembly having a plurality of adjusting holes, two adjusting holes of which corresponding to the two pairs of hitch shank adjusting holes, the two adjusting holes and the two pairs of hitch shank adjusting holes configured to receive a fastener there through when aligned to removably couple the adjustable hitch shank assembly and the adjusting bracket.

8. The dolly of claim 1 further comprising an axle coupled to the bottom side of the platform.

9. The dolly of claim 8, wherein the axle is a torsion axle comprising a cross arm coupled between a pair of control arms, a spindle coupled to each control arm, and a hub coupled to each spindle for mounting tire-wheel assemblies.

10. The dolly of claim 9 further comprising a pair of tire-wheel assemblies, each mounted onto a hub.

11. A dolly for towing trailers comprising:

a main framework comprising a front end portion and a rear end portion;

a ball mount adjusting member configured to receive an adjustable ball mount assembly, the ball mount adjusting member having a plurality of ball mount adjusting holes, and the ball mount adjusting member coupled to the rear end portion of the main framework; and a tongue assembly pivotably coupled to the front end portion of the main framework, the tongue assembly comprising an adjusting bracket configured to receive an adjustable hitch shank assembly, the adjusting bracket having two pairs of hitch shank adjusting holes there through.

12. The dolly of claim 11 further comprising:

an adjustable ball mount assembly having two pairs of adjusting holes corresponding to two ball mount adjusting holes, the two ball mount adjusting holes and the two pair of adjusting holes configured to receive a fastener there through when aligned to removably couple the adjustable ball mount assembly and the ball mount adjusting member at a plurality of different vertical positions; and an adjustable hitch shank assembly having a plurality of adjusting holes, two adjusting holes of which corresponding to the two pairs of hitch shank adjusting holes, the two adjusting holes and the two pairs of hitch shank adjusting holes configured to receive a fastener there through when aligned to removably couple the adjustable hitch shank assembly and the adjusting bracket.

13. The dolly of claim 11 further comprising a platform underneath the main framework comprising a top side and a bottom side.

14. The dolly of claim 11 further comprising a steering assembly comprising:

a steering bracket coupled to the main framework;

a steering hub coupled to the steering bracket and configured to retain a spare tire-wheel assembly a top the main framework; and a steering spindle having first and second end portions, the first end portion rotatably coupled to the steering hub.

15. The dolly of claim 14, further comprising a platform underneath the main framework having a top side and a bottom side, wherein the second end portion of the steering spindle is coupled to the top side of the platform.

16. The dolly of claim 15 further comprising an axle coupled to the bottom side of the platform.

17. The dolly of claim 16, wherein the axle is a torsion axle comprising a cross arm coupled between a pair of control arms, a spindle coupled to each control arm, and a hub coupled to each spindle for mounting tire-wheel assemblies.

18. The dolly of claim 17 further comprising a pair of tire-wheel assemblies, each mounted onto a hub.

19. A dolly for towing trailers comprising:

a main framework comprising a steering bracket and a pair of side members, each side member having a front end portion and a rear end portion, and wherein the steering bracket coupled between rear end portions of the pair of side members;

a ball mount adjusting member configured to receive an adjustable ball mount assembly, the ball mount adjusting member having a plurality of ball mount adjusting holes, and the ball mount adjusting member coupled to the rear end portions of the pair of side members of the main framework;

a tongue assembly pivotably coupled to the front end portions of the main framework, the hinged tongue assembly comprising an adjusting bracket configured to receive an adjustable hitch shank assembly, the adjusting bracket having two pairs of hitch shank adjusting holes there through;

a platform underneath the main framework comprising a top side and a bottom side;

a steering assembly comprising:

a steering hub coupled to the steering bracket and configured to retain a spare tire-wheel assembly a top the main framework; and a steering spindle having first and second end portions, the first end portion rotatably coupled to the steering hub and the second end portion coupled to the top side of the platform; and an axle coupled to the bottom side of the platform.

20. The dolly of claim 19 further comprising:

an adjustable ball mount assembly having two pairs of adjusting holes corresponding to two ball mount adjusting holes, the two ball mount adjusting holes and the two pair of adjusting holes configured to receive a fastener there through when aligned to removably couple the adjustable ball mount assembly and the ball mount adjusting member at a plurality of different vertical positions; and an adjustable hitch shank assembly having a plurality of adjusting holes, two adjusting holes of which corresponding to the two pairs of hitch shank adjusting holes, the two adjusting holes and the two pairs of hitch shank adjusting holes configured to receive a fastener there through when aligned to removably couple the adjustable hitch shank assembly and the adjusting bracket.

21. The dolly of claim 19 the main framework further comprising a rear end plate coupled to the rear end portions of the side members of the main framework, wherein the ball mount adjusting member is coupled to the rear end plate.

22. The dolly of claim 19, further comprising a pair of stabilizing shocks each comprising a front end portion and a rear end portion, each front end portion coupled to the tongue assembly and each rear end portion coupled to the platform.

23. The dolly of claim 19, wherein the axle is a torsion axle comprising a cross arm coupled between a pair of control arms, a spindle coupled to each control arm, and a hub coupled to each spindle for mounting tire-wheel assemblies.

24. The dolly of claim 23, further comprising a pair of tire-wheel assemblies, each mounted onto a hub.

25. A dolly for towing trailers comprising:

a main framework comprising:
  a pair of side members each having tongue aligning holes through a front end portion thereof;
  a front lateral member coupled between the front end portions of the pair of side members;
  a steering bracket coupled between rear end portions of the pair of side members;
  a rear end plate coupled to the rear end portions of the pair of side members; and
  a ball mount adjusting member having a plurality of ball mount adjusting holes, the ball mount adjusting member coupled to the rear end plate;

a tongue assembly pivotably coupled to the main framework, the tongue assembly comprising:
  a pair of framework mounting brackets coupled to the front end portions of the pair of side members, each framework mounting bracket comprising:
    a pair of bracket plates having main framework aligning holes corresponding to the tongue aligning holes, the framework aligning holes and the tongue aligning holes configured to receive a fastener there through to removable and hingedly couple the main framework and the tongue assembly;
    a lateral member coupled between the pair of framework mounting brackets, the lateral member comprising front and bottom sides;
    an adjusting bracket configured to receive an adjustable hitch shank, the adjusting bracket having two pairs of hitch shank adjusting holes, and the adjusting bracket coupled to the front side of the lateral member, and
    an L-bracket coupled to the bottom side of the lateral member;

a pair of stabilizing shocks comprising front and rear end portions, respectively, each front end portion coupled to the L-bracket;

an axle platform comprising a top side, a bottom side, and a pair of opposing shock mounting brackets, each shock mounting bracket coupled to the rear end portion of each stabilizing shock;

a steering assembly comprising:
  a steering hub coupled to the steering bracket and configured to retain a spare tire-wheel assembly atop the main framework; and
  a steering spindle having first and second end portions, the first end portion rotatably coupled to the steering hub and the second end portion coupled to the top side of the axle platform;

a torsion axle coupled to the bottom side of the axle platform, the torsion axle comprising:
  a cross arm coupled between a pair of control arms;
  a spindle coupled to each control arm; and
  a hub coupled to each spindle for mounting tire-wheel assemblies;

a pair of tire-wheel assemblies, each mounted onto a hub;

an adjustable ball mount assembly having two pairs of adjusting holes corresponding to two ball mount adjusting holes, the two pairs of adjusting holes and the two ball mount adjusting holes configured to receive a fastener there through when aligned to removably couple the adjustable ball mount assembly and the ball mount adjusting member; and an adjustable hitch shank assembly having a plurality of adjusting holes, two adjusting holes of which corresponding to the two pairs of hitch shank adjusting holes, the two adjusting holes and the two pairs of hitch shank adjusting holes configured to receive a fastener there through when aligned to removably couple the adjustable hitch shank assembly and the adjusting bracket.

26. The dolly of claim 25 further comprising a spring bar weight distributing assembly coupled to the adjustable ball mount assembly.

27. The dolly of claim 25 further comprising a sway control assembly coupled to the adjustable ball mount assembly.

28. The dolly of claim 25, wherein the adjustable hitch shank assembly is coupled to a hitch receiver of a towing vehicle and the adjustable ball mount assembly is coupled to a trailer tongue socket hitch.

* * * * *